United States Patent
Fuyama et al.

(10) Patent No.: US 7,857,123 B2
(45) Date of Patent: Dec. 28, 2010

(54) PARTS CONVEYOR APPARATUS

(75) Inventors: Mitsuru Fuyama, Adumino (JP); Shin Takeda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 12/211,684

(22) Filed: Sep. 16, 2008

(65) Prior Publication Data

US 2009/0101480 A1 Apr. 23, 2009

(30) Foreign Application Priority Data

Oct. 23, 2007 (JP) ............................. 2007-274750
Jul. 3, 2008 (JP) ............................. 2008-174259

(51) Int. Cl.
*B65G 27/24* (2006.01)
(52) U.S. Cl. ..................... 198/769; 198/758; 198/766
(58) Field of Classification Search .............. 198/750.8, 198/759, 763, 766, 769, 762, 761, 758
See application file for complete search history.

(56) References Cited

U.S. PATENT DOCUMENTS

| | | | | |
|---|---|---|---|---|
| 3,045,810 A | * | 7/1962 | Holt ............................ | 198/763 |
| 3,583,553 A | * | 6/1971 | Spurlin et al. ............... | 198/763 |
| 4,088,223 A | * | 5/1978 | Bertrand ..................... | 198/761 |
| 4,260,052 A | * | 4/1981 | Brown ........................ | 198/763 |
| 4,315,817 A | * | 2/1982 | Popper ....................... | 209/315 |
| 5,127,512 A | * | 7/1992 | Frolich et al. ............... | 198/751 |
| 5,664,664 A | * | 9/1997 | Gaines ........................ | 198/769 |
| 5,944,170 A | * | 8/1999 | LaVeine et al. ............. | 198/762 |
| 6,145,652 A | * | 11/2000 | Durnil ........................ | 198/753 |
| 6,659,267 B2 | * | 12/2003 | Patterson .................... | 198/771 |
| 6,868,960 B2 | * | 3/2005 | Jones ......................... | 198/770 |
| 7,472,898 B2 | * | 1/2009 | Kraus ......................... | 267/136 |

* cited by examiner

*Primary Examiner*—Joe Dillon, Jr.
(74) *Attorney, Agent, or Firm*—DLA Piper LLP (US)

(57) ABSTRACT

A parts conveyor apparatus that conveys parts using the vibrations includes an electromagnetic motor that generates the vibrations; a rotary panel which is mounted on an output shaft of the electromagnetic motor and rotates eccentrically by the rotation of the output shaft; and a spring member which vibrates by the rotation of the rotary panel.

8 Claims, 7 Drawing Sheets

PARTS CONVEYOR APPARATUS

Japanese Patent Application No. 2007-274750 filed on Oct. 23, 2007 and Japanese Patent Application No. 2008-174259 filed on Jul. 3, 2008, are hereby incorporated by reference in their entirety.

BACKGROUND

1. Technical Field

The present invention relates to a parts conveyor apparatus that conveys parts using the vibrations.

2. Related Art

In the related art, as a parts conveyor apparatus that conveys parts using the vibrations, a configuration having an electromagnet employed as a drive source, and conveying parts on a conveyor unit by transmitting the vibrations of an exciter of the electromagnet to a conveyor unit via a leaf spring using an attractive force of the electromagnet, a repulsion energy of the leaf spring and resonance, and vibrating the parts on the conveyor unit is known.

The parts conveyor apparatus having the electromagnet has a complex structure and has a tendency to be upsized. There is also a problem such that the level of the operating noise of the leaf spring is high, and hence a noise problem is resulted. Therefore, a parts conveyor apparatus which has a compact and simple structure and is free from the noise problem has been required.

SUMMARY

An advantage of some aspect of the invention is that at least part of the problem described above is solved by the following modes.

According to a first aspect of the invention, a parts conveyor apparatus that conveys parts using the vibrations includes an electromagnetic motor that generates the vibrations; a rotary panel which is mounted on an output shaft of the electromagnetic motor and rotates eccentrically by the rotation of the output shaft; and a spring member which vibrates by the rotation of the rotary panel.

In this configuration, the electromagnetic motor, the rotary panel and the spring member are provided, and the rotary panel mounted on the output shaft of the electromagnetic motor rotates eccentrically by the rotation of the output shaft, and the spring member vibrates by the eccentric rotation, so that the vibrations are occurred in the parts conveyor apparatus. Accordingly, the configuration to cause the vibrations in the parts conveyor apparatus is achieved in a simple structure. In this configuration, downsizing of the parts conveyor apparatus is achieved. For example, energy saving is achieved by using the electromagnetic motor such as a DC (Direct Current) motor. In addition, noise reduction is achieved in comparison with a driving system using an electromagnet or a leaf spring in the related art.

Preferably, a conveyor unit that conveys the parts, and a vibration transmission auxiliary unit that connects the spring member and the conveyor unit and transmits the vibrations of the spring member to the conveyor unit are further provided.

In this configuration, with the provision of the conveyor unit and the vibration transmission auxiliary unit, the vibration transmission auxiliary unit transmits the vibrations of the spring member to the conveyor unit, and the conveyor unit vibrates the parts loaded on the conveyor unit to convey the parts. Therefore, the vibrations generated by the electromagnetic motor, the rotary plate and the spring member are effectively transmitted to the conveyor unit only via the vibration transmission auxiliary unit.

Preferably, a column support that supports the parts conveyor apparatus and a column support fixing unit that fixes the column support to the conveyor unit and a base are further provided.

In this configuration, the parts conveyor apparatus is supported by the column support, and the column support is fixed to the conveyor unit and the base by the column support fixing unit. Accordingly, the parts conveyor apparatus is fixed to the base in a simple structure with the column support and the column support fixing unit. In addition, since the vibrations of the conveyor unit are transmitted also to the column support, the vibrations of the conveyor unit are further amplified, so that efficient conveyance of the parts loaded on the conveyor unit is achieved.

Preferably, the electromagnetic motor is fixed with the direction of the axis of the output shaft thereof oriented in substantially vertically to a direction of a plane of the spring member, and the rotary panel rotates in substantially parallel to the plane of the spring member.

In this configuration, fixation of the electromagnetic motor to the spring member is achieved compactly, and the vibrations generated by the rotation of the rotary panel are efficiently transmitted to the spring member.

Preferably, the spring member includes a motor fixing area to which the electromagnetic motor is fixed, a vibrating portion which vibrates by the rotation of the rotary panel, and a vibration transmitting area which transmits the vibrations of the vibrating portion, and the motor fixing area, the vibrating portion and the vibration transmitting area are integrated to each other.

In this configuration, the spring member integrally includes the motor fixing area, the vibrating portion and the vibration transmitting area. By fixing the electromagnetic motor to the motor fixing area and driving the electromagnetic motor, the rotary panel rotates eccentrically and hence the motor fixing area vibrates. The vibrations caused by the eccentric rotation are transmitted to the vibrating portion without being attenuated owing to the integrated configuration of the spring member. The vibrations transmitted to the vibrating portion are further amplified by the vibrating portion. The amplified vibrations are transmitted to the vibration transmitting area without being attenuated owing to the integrated configuration of the spring member. Therefore, the spring member is efficiently vibrated in a compact configuration.

Preferably, the vibrating portion vibrates in substantially parallel to the plane of the spring member.

In this configuration, since the vibrating portion vibrates in substantially parallel to the plane of the spring member, the vibrations in the motor fixing area are efficiently transmitted. The vibrating portion is able to vibrate efficiently, and is able to transmit the vibrations thereof efficiently to the vibration transmitting area.

Preferably, the vibrating portion is made up of a leaf spring member.

Since the vibrating portion is made up of the leaf spring member, it is easily machined and hence the vibrating portion is easily formed.

Preferably, the leaf spring member is formed so as to be interposed between notches formed therethrough in the direction of thickness of the spring member.

In this configuration, since the leaf spring member is formed so as to be interposed between the notches formed therethrough in the direction of thickness of the spring member, complicated machining in the direction of thickness of the spring member is not necessary, and integration by connection as in the case of being formed as a separate member is not necessary. Therefore, the integrated vibrating portion is easily formed.

Preferably, the vibrating portion is made up of a wire spring member.

Since the vibrating portion is made up of the wire spring member, it is easily machined and hence the vibrating portion is easily formed.

Preferably, a reduction gear unit that reduces the number of revolutions of the electromagnetic motor is provided.

In this configuration, with the provision of the reduction gear unit, the number of revolutions of the electromagnetic motor is reduced and hence a noise generated by the rotation of the rotary panel is further reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
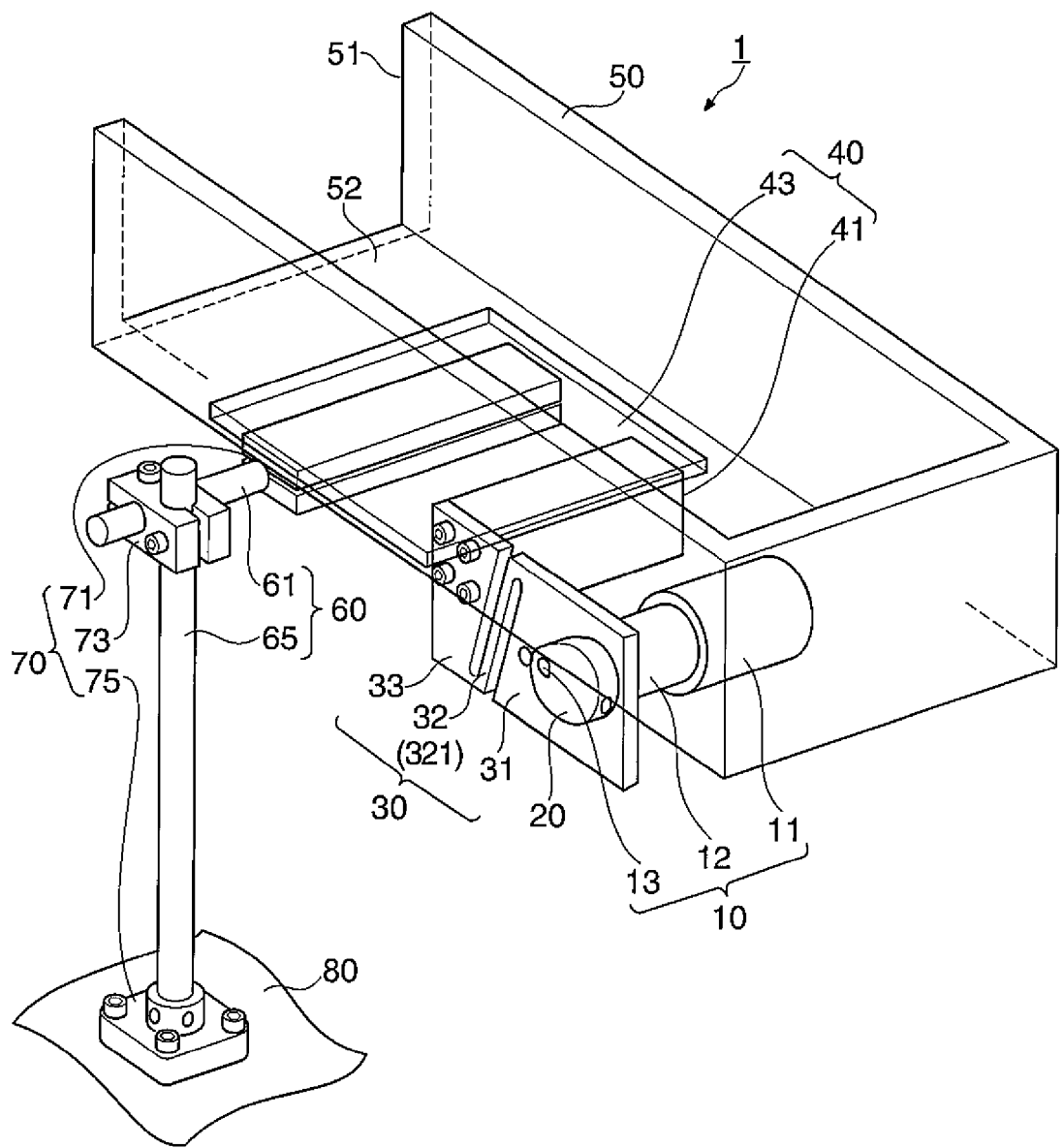
FIG. 1 is a perspective view showing a parts conveyor apparatus according to a first embodiment.

Referring now to the drawings, embodiments of the invention will be described.

First Embodiment

Figure 2:
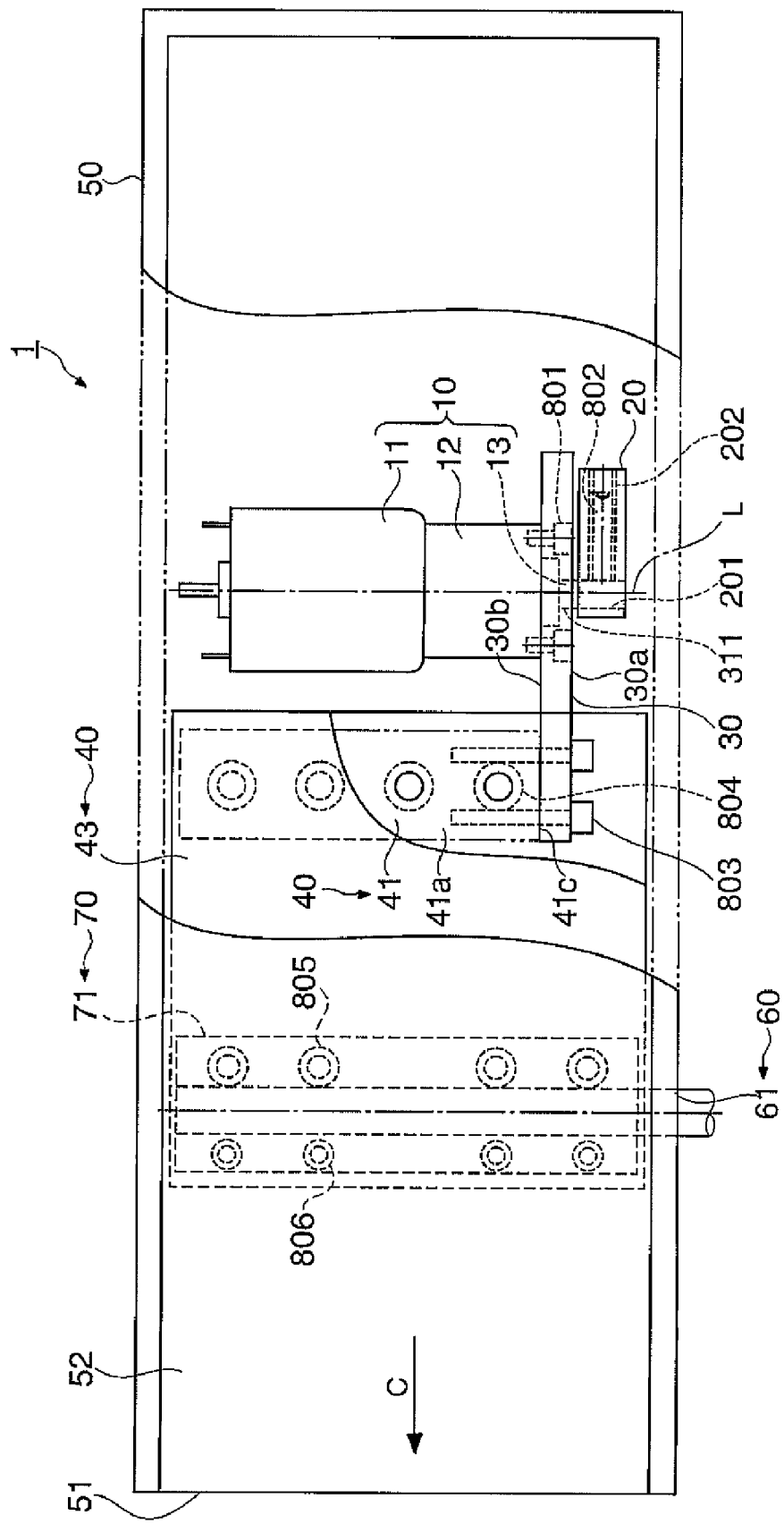
FIG. 2 is a plan view of the parts conveyor apparatus.
Figure 3:
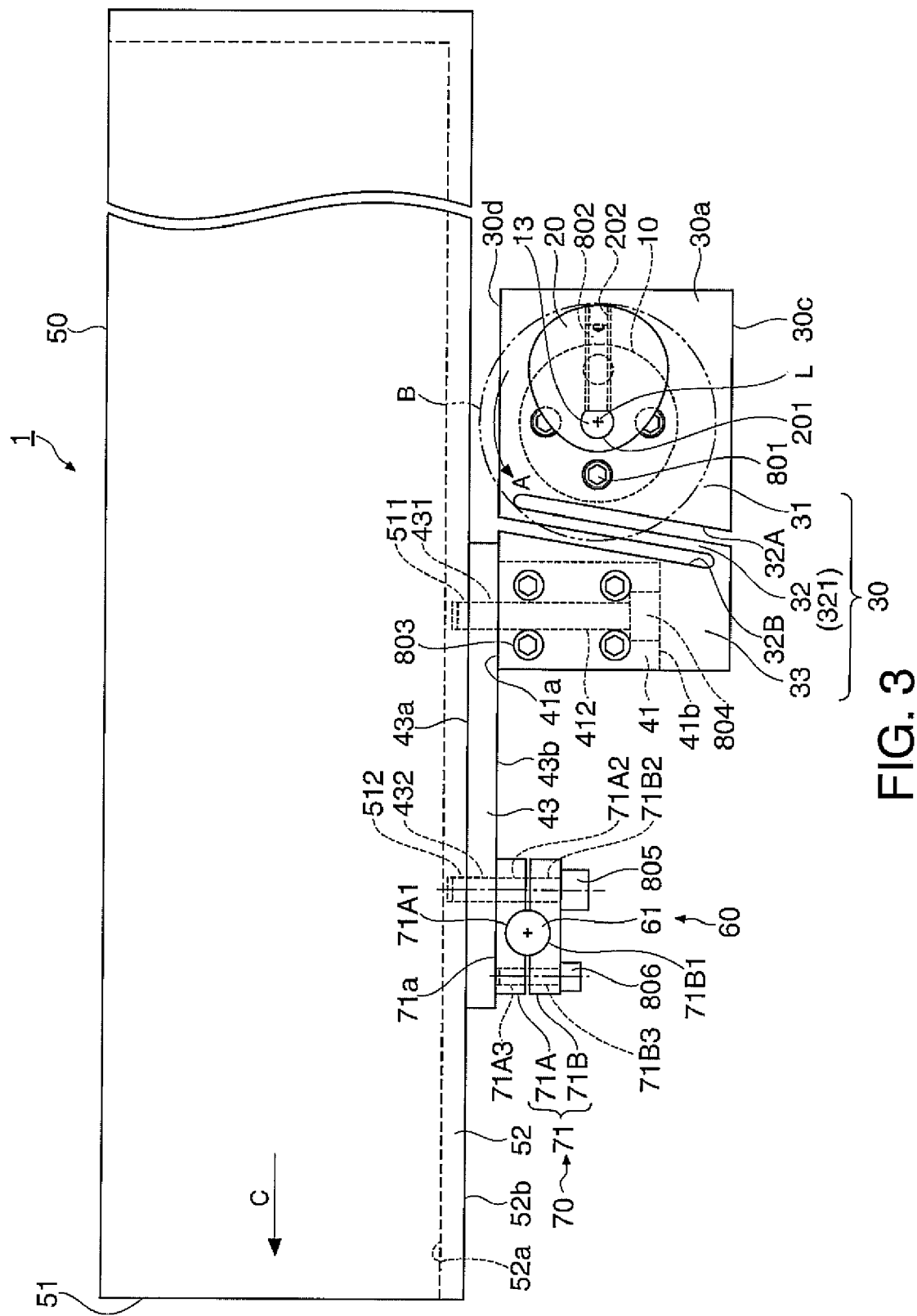
FIG. 3 is a side view of the parts conveyor apparatus.
Figure 4:
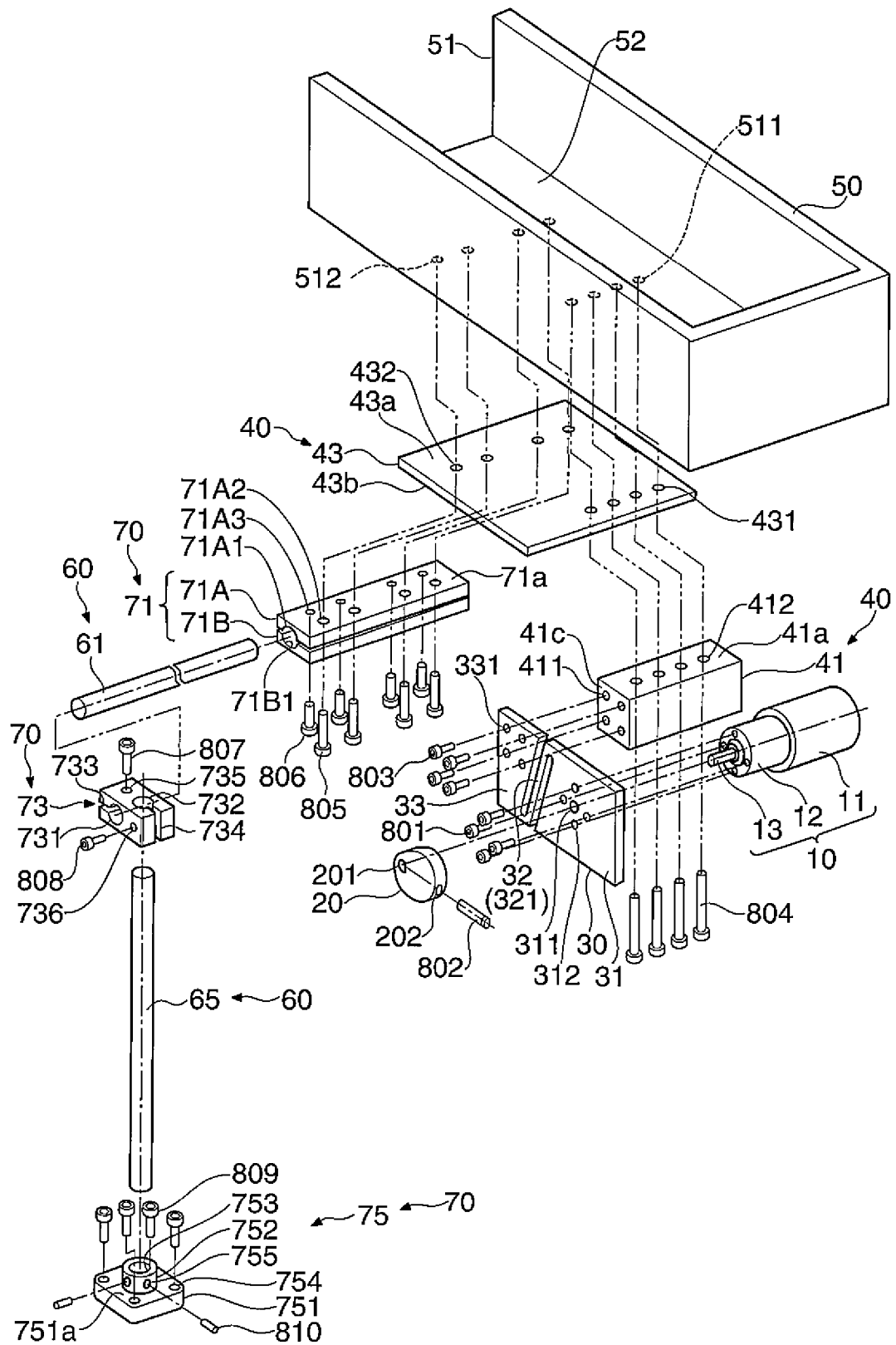
FIG. 4 is an assembly drawing of the parts conveyor apparatus.

FIG. 1 is a perspective view showing a parts conveyor apparatus according to a first embodiment. FIG. 2 is a plan view of the parts conveyor apparatus. FIG. 3 is a side view of the parts conveyor apparatus. FIG. 4 is an assembly drawing of the parts conveyor apparatus. In FIGS. 1 and 2, portions which are actually invisible are indicated by solid lines that makes positional relations of principle members in a parts conveyor apparatus 1 understandable. Referring now to FIGS. 1 to 4, the configuration, the operation and the assembly of the parts conveyor apparatus 1 will be described.

As shown in FIG. 1, the parts conveyor apparatus 1 in the first embodiment is applied as the linear parts conveyor apparatus 1. The parts conveyor apparatus 1 includes a DC motor 10 as an electromagnetic motor, a rotary panel 20, a spring member 30, a vibration transmission auxiliary unit 40, a conveyor unit 50, a column support 60, and a column support fixing unit 70. The parts conveyor apparatus 1 is installed on a base 80.

As shown in FIGS. 1 and 2, the DC motor 10 integrally includes a DC motor body 11 that rotates a shaft (not shown) by a magnetic field and an electric current, a reduction gear unit 12 that engages the shaft of the DC motor body 11 and reduces the number of revolutions using a planetary gear (not shown) or the like, and an output shaft 13 that rotates at the reduced number of revolution. The DC motor 10 in the first embodiment employs a motor which is so-called geared motor.

As shown in FIGS. 2 and 3, the reduction gear unit 12 of the DC motor 10 is fixed to the spring member 30. With this fixation, the direction of an axis L of the output shaft 13 is oriented substantially vertically to the direction of a plane (a front surface 30a) of the spring member 30.

A method of fixing the DC motor 10 to the spring member 30 will be described in detail below. As shown in FIG. 4, first of all, the output shaft 13 of the DC motor 10 is inserted into an output shaft hole 311 formed on a motor fixing area 31 of the spring member 30, described later, from a side of a rear surface 30b (see FIG. 2) of the spring member 30. Then, motor fixing screws 801 are inserted into four motor fixing holes 312 (which correspond to fixing holes formed on the reduction gear unit 12 of the DC motor 10) formed around the output shaft hole 311 of the spring member 30 and screwed into the fixing holes formed on the reduction gear unit 12. Consequently, the DC motor 10 is fixed to the motor fixing area 31 of the spring member 30.

The rotary panel 20 is formed of metallic material. The rotary panel 20 is formed into a substantially circular disk shape having an eccentric center as shown in FIGS. 2 and 3, and is fixed to the output shaft 13 of the DC motor 10 which extends through the spring member 30 in a state of nipping the spring member 30 therebetween. The rotary panel 20 rotates eccentrically in substantially parallel to the plane (the front surface 30a) of the spring member 30 about the output shaft 13 by the rotation of the output shaft 13 of the DC motor 10. The direction of rotation of the rotary panel 20 is indicated by an arrow A in FIG. 3. An outermost contour of a trajectory of the rotation of the rotary panel 20 is indicated by a double-dashed line B.

A method of fixing the rotary panel 20 to the output shaft 13 will be described in detail below. As shown in FIG. 4, first of all, the output shaft 13 of the DC motor 10 extending from the output shaft hole 311 of the spring member 30 is inserted into an output shaft insertion hole 201 formed on the rotary panel 20. Then, a rotary panel fixing screw 802 is inserted into an output shaft fixing hole 202 formed from an outer peripheral end surface of the rotary panel 20 to the output shaft insertion hole 201 with a thread and screwed therein, so that the rotary panel 20 is fixed to the output shaft 13.

The spring member 30 is formed of metallic material into a substantially plate shape. The spring member 30 is formed into a substantially rectangular shape, and is installed in such a manner that the direction of the plane (the front surface 30a) of the spring member 30 is oriented in substantially parallel to a direction of conveyance C (the direction indicated by arrows in FIGS. 2 and 3) of parts of the parts conveyor apparatus 1. A single piece of the substantially rectangular shaped spring member 30 includes the motor fixing area 31 to which the DC motor 10 is fixed, a vibrating portion 32 and a vibration transmitting area 33 which carry out three different actions, respectively, as shown in FIG. 3. In the first embodiment, the spring member 30 is integrally formed by machining the same metallic material.

The motor fixing area 31 is an area to which the DC motor 10 is fixed as described above, and the reduction gear unit 12 of the DC motor 10 is fixed thereto, and the output shaft 13 is penetrated therethrough. The vibrating portion 32 is provided on the downstream side of the motor fixing area 31, and on an upstream side of the vibration transmitting area 33 in terms of the direction of conveyance C. The vibrating portion 32 is formed as a linear arm-shaped leaf spring member 321 in a state of being interposed between two notches 32A and 32B. The notch 32A is formed by removing a portion of the spring member 30 from a lower side surface 30c toward an upper side surface 30d thereof so as to penetrate through the spring member 30 in the direction of thickness (in the direction from the front surface 30a to the rear surface 30b), and the notch 32B is formed by removing a portion of the spring member 30 from the upper side surface 30d to the lower side surface 30c thereof so as to extend in substantially parallel to the notch 32A. The vibrating portion 32 formed as the leaf spring member 321 is formed in such a manner that the side on the lower side surface 30c is inclined in the direction of conveyance C with respect to the side on the upper side surface 30d. The vibrating portion 32 thus formed is formed as a "spring" that vibrates substantially in parallel to the plane (the front surface 30a) of the spring member 30. More specifically, the two notches 32A and 32B are formed by cutting with a tool such as a drill.

The vibration transmitting area 33 is an area that transmits the vibrations of the vibrating portion 32 formed on the upstream side to the vibration transmission auxiliary unit 40, described later, and is fixed to the vibration transmission auxiliary unit 40 on the rear surface 30b of the spring member 30 on the side of the upper side surface 30d of the spring member 30.

The vibrations of the spring member 30 will now be described.

The motor fixing area 31 of the spring member 30 vibrates in substantially parallel to the front surface 30a including the DC motor 10 by the eccentric rotation of the rotary panel 20 in substantially parallel to the front surface 30a. The vibrations in the motor fixing area 31 are directly transmitted to the vibrating portion 32 which is formed integrally with the spring member 30, and hence the vibrating portion 32 vibrates in substantially parallel to the front surface 30a. Accordingly, the vibrations in the motor fixing area 31 are converted into the vibrations amplified by the vibrating portion 32. The vibrations amplified by the vibrating portion 32 are directly transmitted to the vibration transmitting area 33 formed integrally with the spring member 30.

The vibration transmission auxiliary unit 40 is connected (fixed) to the vibration transmitting area 33 of the spring member 30 and the conveyor unit 50, described later, and transmits the vibrations of the spring member 30 to the conveyor unit 50. The vibration transmission auxiliary unit 40 includes a first auxiliary plate 41 and a second auxiliary plate 43. The first auxiliary plate 41 is formed of metallic material into a rectangular parallelepiped panel, and is fixed to the vibration transmitting area 33 of the spring member 30 and a lower surface 43b of the second auxiliary plate 43. The second auxiliary plate 43 is formed of metallic material into a rectangular plate and is fixed to the first auxiliary plate 41 and a bottom surface 52b of the conveyor unit 50 (see FIG. 3).

A method of fixing the first auxiliary plate 41 to the spring member 30 will be described in detail below. As shown in FIG. 4, first auxiliary plate fixing screws 803 inserted through four insertion holes 331 formed on the vibration transmitting area 33 of the spring member 30 are screwed and fixed into screwed spring member fixing holes 411 formed on a front surface 41c of the first auxiliary plate 41 corresponding to the insertion holes 331. Accordingly, the rear surface 30b of the vibration transmitting area 33 of the spring member 30 and the front surface 41c of the first auxiliary plate 41 are fixed in abutment.

A method of fixing the first auxiliary plate 41 to the second auxiliary plate 43 will be described in detail below. As shown in FIG. 4, first auxiliary plate fixing screws 804 inserted through four insertion holes 412 formed through the first auxiliary plate 41 from a lower surface 41b (see FIG. 3) to an upper surface 41a are screwed and fixed into screwed first auxiliary plate fixing holes 431 formed through the second auxiliary plate 43 from the lower surface 43b to an upper surface 43a corresponding to the insertion holes 412. The first auxiliary plate fixing screws 804 are also screwed into four screwed fixing holes 511 formed on the bottom surface 52b of a bottom plate 52 of the conveyor unit 50 corresponding to the first auxiliary plate fixing holes 431. Accordingly, the upper surface 41a of the first auxiliary plate 41 and the lower surface 43b of the second auxiliary plate 43 are fixed in abutment. The upper surface 43a of the second auxiliary plate 43 and the bottom surface 52b of the bottom plate 52 of the conveyor unit 50 are also fixed in abutment.

With the fixation as described above, the first auxiliary plate fixing screws 804 fix the first auxiliary plate 41 and the second auxiliary plate 43 to the bottom plate 52 of the conveyor unit 50. Therefore, the spring member 30 to be fixed to the first auxiliary plate 41, the DC motor 10 to be fixed to the spring member 30, and the rotary panel 20 to be fixed to the output shaft 13 of the DC motor 10 are fixed to the bottom plate 52 of the conveyor unit 50.

In the first embodiment, the conveyor unit 50 is formed into a rectangular parallelepiped box-shape, and is formed with a feeding port 51 by removing one of walls in the longitudinal direction. Parts 2 (see FIG. 5) are loaded in the interior of the conveyor unit 50 (an upper surface 52a of the bottom plate 52). The bottom plate 52 of the conveyor unit 50 is formed of metallic material, and other portions are formed of synthetic resin and are assembled with fixing screws (not shown) or the like.

In the parts conveyor apparatus 1 assembled in this manner, the spring member 30 vibrates when the DC motor 10 is driven, and the vibrations generated thereby are transmitted to the vibration transmission auxiliary unit 40 (the first auxiliary plate 41, the second auxiliary plate 43) and are transmitted to the conveyor unit 50, whereby the parts 2 are moved in the direction of conveyance (the direction of the feeding port 51) on the upper surface 52a of the bottom plate 52 and are delivered to the outside from the feeding port 51. A parts feeder apparatus 9 (see FIG. 5) having a bowl 900, described later, is installed below the feeding port 51, and the parts 2 drop from the conveyor unit 50 of the parts conveyor apparatus 1 into the interior of the bowl 900, whereby the parts 2 are fed to the parts feeder apparatus 9.

The parts conveyor apparatus 1 having the DC motor 10, the rotary panel 20, the spring member 30, the vibration transmission auxiliary unit 40 and the conveyor unit 50 assembled together is supported by the column support 60 in the first embodiment, and is fixed to the base 80. More specifically, the column support 60 is fixed using the column support fixing unit 70.

In the first embodiment, the column support 60 includes column-shaped first column support 61 and second column support 65. The column support fixing unit 70 includes a first clamp 71, a second clamp 73 and a bracket 75, which are all formed of metallic material.

As shown in FIGS. 3 and 4, the first clamp 71 is a member that fixes the first column support 61 by clamping the first column support 61, and fixes the same to the second auxiliary plate 43. The first clamp 71 includes an upper first clamp 71A and a lower first clamp 71B separately, which are formed with grooves 71A1 and 71B1 having a circular cross-section on opposed surfaces thereof for clamping the first column support 61. When the first column support 61 is clamped between the grooves 71A1 and 71B1, the opposed surfaces are set to have a gap secured therebetween.

As shown in FIGS. 3 and 4, the opposed surfaces of the upper first clamp 71A and the lower first clamp 71B are formed with four insertion holes 71A2 and 71B2 on one side of the grooves 71A1 and 71B1, respectively. The insertion holes 71A2 of the upper first clamp 71A are screwed. In the same manner, four insertion holes 71A3 and 71B3 are formed on the other side, respectively. The insertion holes 71A3 of the upper first clamp 71A are screwed. The second auxiliary plate 43 is formed with screwed fixing holes 432 at positions corresponding to the insertion holes 71A2 of the upper first clamp 71A. The bottom plate 52 of the conveyor unit 50 is formed with fixing holes 512 at positions corresponding to the insertion holes 71A2 of the upper first clamp 71A. The second auxiliary plate 43 is fixed to the bottom plate 52 of the conveyor unit 50 as described above.

A method of fixing the first column support 61 with the first clamp 71 and a method of fixing the first clamp 71 to which the first column support 61 is fixed and the conveyor unit 50 will be described.

One end of the first column support 61 is clamped between the grooves 71A1 and 71B1 of the upper first clamp 71A and the lower first clamp 71B, first clamp fixing screws 805 are inserted into the insertion holes 71B2 of the lower first clamp 71B and screwed into the opposed insertion holes 71A2 of the upper first clamp 71A. Then, first clamp fixing screws 806 are inserted into the insertion holes 71B3 of the lower first clamp 71B and screwed into the opposed insertion holes 71A3 of the upper first clamp 71A. Accordingly, the first column support 61 is fixed (clamped) by the first clamp 71.

Then, in a state in which the first column support 61 is fixed by the first clamp 71, an upper surface 71a of the upper first clamp 71A is brought into abutment with the lower surface 43b of the second auxiliary plate 43, and the first clamp fixing screws 805 are screwed into the fixing holes 432 of the second auxiliary plate 43. The second auxiliary plate 43 is fixed to the bottom plate 52 of the conveyor unit 50 by the first auxiliary plate fixing screws 804 as described above. Therefore, by screwing the first clamp fixing screws 805 inward continuously, they are screwed into the fixing holes 512 formed on the bottom plate 52. Accordingly, the first column support 61 fixed by the first clamp 71 and the conveyor unit 50 are fixed.

The second clamp 73 includes an insertion hole 731 formed therethrough for allowing insertion of the first column support 61 and an insertion hole 732 for allowing insertion of the second column support 65 formed therethrough in a direction orthogonal to the insertion hole 731. The second clamp 73 is formed with a slit 733 extending from a side surface of the insertion hole 731 to the side surface of the second clamp 73 at the shortest distance from the insertion hole 731. In the same manner, the second clamp 73 is formed with a slit 734 extending from a side surface of the insertion hole 732 to the side surface of the second clamp 73 at the shortest distance from the insertion hole 732. The second clamp 73 is also provided with a fixing hole 735 formed orthogonally to the slit 733 and a fixing hole 736 formed orthogonally to the slit 734.

A method of fixing the parts conveyor apparatus 1 in a state in which the first column support 61 is fixed to the conveyor unit 50 with the first clamp 71 to the second clamp 73 and a method of fixing the second column support 65 to the second clamp 73 will be described.

The other end of the first column support 61 clamped by the first clamp 71 which is to be fixed to the conveyor unit 50 is inserted into the insertion hole 731 of the second clamp 73. Then, a first column support fixing screw 807 is inserted and screwed into the fixing hole 735, so that the first column support 61 is fixed to (clamped by) the second clamp 73.

Then, one end of the second column support 65 is inserted into the insertion hole 732 of the second clamp 73. Then, a second column support fixing screw 808 is inserted and screwed into the fixing hole 736, so that the second column support 65 is fixed to (clamped by) the second clamp 73.

The bracket 75 is integrally formed with a cylindrical guide 752 having an insertion hole 753 for allowing insertion of the second column support 65 on an upper surface 751a of a bracket body 751, which is formed into a rectangular plate shape. The bracket body 751 is formed with insertion holes 754 that fix the bracket 75 to the base 80 at four corners of the upper surface 751a thereof. A surface of the base 80 opposing the insertion holes 754 is formed with screwed fixing holes (not shown). The guide 752 of the bracket 75 is formed with two screwed fixing holes 755 extending orthogonally to each other toward the center of the cylinder on a cylindrical side surface.

The bracket 75 configured as described above is placed in such a manner that the insertion holes 754 of the bracket 75 face the fixing holes of the base 80, and bracket fixing screws 809 are inserted into the insertion holes 754 and screwed into the fixing holes of the base 80, so that the bracket 75 is fixed to the base 80.

Subsequently, the other end of the second column support 65 clamped by the second clamp 73 of the parts conveyor apparatus 1 assembled in the manner as described above is inserted into the insertion hole 753 of the bracket 75 which is fixed to the base 80. Then, a second column support fixing screw 810 is inserted into the fixing holes 755 and screwed, so that the second column support 65 is fixed to the bracket 75.

With the series of methods of assembly as described above, the parts conveyor apparatus 1 is assembled and the parts conveyor apparatus 1 is fixed to the base 80.

The method of assembly is not limited to the methods described above, and the method of assembly may be modified according to the place to fix the parts conveyor apparatus 1 and the environment. The user is able to install the parts conveyor apparatus 1 simply by fixing the bracket 75 to a desired position on the base 80. The user is able to adjust the parts conveyor apparatus 1 to a desired height, orientation, and position only by loosening the first column support fixing screw 807 of the second clamp 73 or the second column support fixing screw 808, and to fix the same again after adjustment.

Since the DC motor 10, the column support 60 (the first column support 61, the second column support 65), the column support fixing unit 70 (the second clamp 73, the bracket 75) and various screws used in the parts conveyor apparatus 1 according to the first embodiment are commercially available, the user is allowed to select members having desired specifications to configure the parts conveyor apparatus 1.

Figure 5:
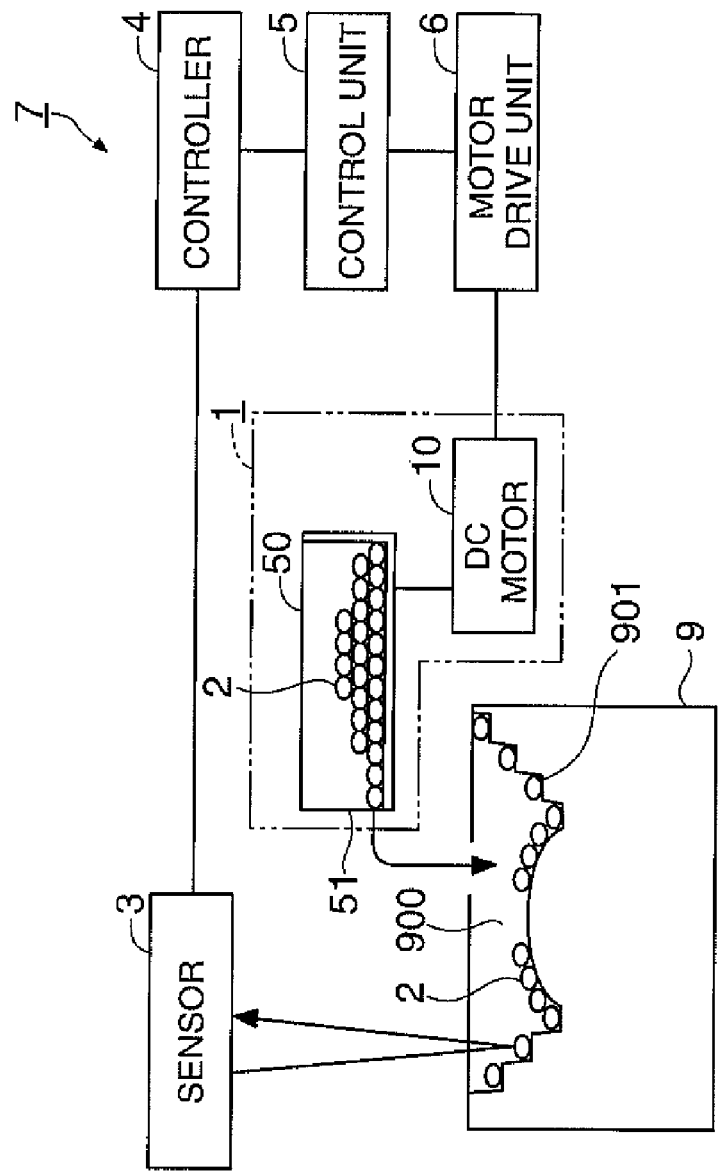
FIG. 5 is a block diagram showing a driving system that drives the parts conveyor apparatus.

FIG. 5 is a block diagram showing a drive system that drives the parts conveyor apparatus. FIG. 5 is a block diagram of a parts feeding system 7 that feeds the parts 2 including the parts conveyor apparatus 1. Referring now to FIG. 5, the configuration and the operation of the parts feeding system 7 including the parts conveyor apparatus 1 will be described.

The parts feeding system 7 includes the parts feeder apparatus 9 having the bowl 900, a sensor 3, a controller 4, a control unit 5, a motor drive unit 6, and the parts conveyor apparatus 1. The parts feeder apparatus 9 includes the same components as in the related art having the bowl 900, an electromagnet, and a vibrating panel. The bowl 900 of the parts feeder apparatus 9 has a bottom swelled at the center, and a helical rail 901 on the inner periphery thereof. With the operation of the electromagnet and the vibrating panel, the parts 2 are conveyed upward along the rail 901.

The sensor 3 employed in the first embodiment is a laser sensor. The sensor 3 irradiates the rail 901 with a laser beam at a predetermined portion thereof, detects an amount of reflected laser beam, and outputs the value thereof to the controller 4. The controller 4 determines whether it is necessary to feed the parts 2 on the basis of a value of reflection of the laser beam entering from the sensor 3 or not, and when it is necessary to feed the parts 2, outputs a signal indicating the result to the control unit 5.

The control unit 5, upon entry of the signal from the controller 4, outputs a signal which gives an instruction to the motor drive unit 6 to drive the DC motor 10 of the parts conveyor apparatus 1. The motor drive unit 6 feeds a predetermined electric power to the DC motor 10 of the parts conveyor apparatus 1 and drives the same on the basis of the signal from the control units. The period to operate the motor drive unit 6 (the period when the DC motor 10 is driven) is determined by a period that the user sets for the control unit 5 initially. The electric power required for driving the DC motor 10 is approximately 2 Watt in the first embodiment.

When the DC motor 10 is driven, the rotary panel 20 described above rotates eccentrically, whereby the spring member 30 vibrates. The vibrations of the spring member 30 are transmitted to the conveyor unit 50, and the parts 2 loaded on the conveyor unit 50 are advanced and conveyed linearly to the feeding port 51. When the parts 2 drop downward from the feeding port 51, the parts 2 are fed to the interior of the bowl 900 of the parts feeder apparatus 9 installed below the feeding port 51.

In the first embodiment, the following advantages are achieved.

(1) The parts conveyor apparatus 1 in the first embodiment includes the DC motor 10 as an electromagnetic motor, the rotary panel 20, and the spring member 30, and the rotary panel 20 installed on the output shaft 13 of the DC motor 10 is rotated eccentrically by the rotation of the output shaft 13, and the eccentric rotation causes the spring member 30 to vibrate, so that the vibrations are occurred in the parts conveyor apparatus 1. Accordingly, a configuration to cause the parts conveyor apparatus 1 to vibrate is achieved in a simple method. In this configuration, downsizing of the parts conveyor apparatus 1 is achieved. A noise (operating sound) is reduced in comparison with the driving using the electromagnet and the leaf spring in the related art.

(2) The parts conveyor apparatus 1 in the first embodiment employs the DC motor 10, and the DC motor 10 requires a drive power of approximately 2 Watt in the first embodiment. It is known by the trial calculation by the inventors that a drive power of about 20 Watt is required when driving the parts conveyor apparatus 1 in the first embodiment using the electromagnet and the leaf spring in the related art. Therefore, with the configuration including the DC motor 10, the rotary panel 20, and the spring member 30 in the first embodiment, significant energy saving is achieved in comparison with the related art.

(3) In the parts conveyor apparatus 1 in the first embodiment, with the provision of the conveyor unit 50 and the vibration transmission auxiliary unit 40 (the first auxiliary plate 41 and the second auxiliary plate 43), the vibration transmission auxiliary unit 40 transmits the vibrations of the spring member 30 to the conveyor unit 50, and the conveyor unit 50 conveys the parts 2 loaded on the bottom plate 52 by vibrating the bottom plate 52 of the conveyor unit 50. Therefore, the vibrations generated by the DC motor 10, the rotary panel 20, and the spring member 30 are efficiently transmitted to the conveyor unit 50 only via the vibration transmission auxiliary unit 40.

(4) The parts conveyor apparatus 1 in the first embodiment is supported by the column support 60 (the first column support 61, the second column support 65), and the column support 60 is fixed to the conveyor unit 50 and the base 80 by the column support fixing unit 70 (the first clamp 71 and the second clamp 73 and the bracket 75). Accordingly, the parts conveyor apparatus 1 is fixed to the base 80 in a simple configuration by the column support 60 and the column support fixing unit 70. Since the further amplification of the vibrations of the conveyor unit 50 is achieved by the vibrations of the conveyor unit 50 transmitted to the column support 60, conveyance of the parts 2 loaded on the conveyor unit 50 is efficiently achieved. Since the vibrations of the conveyor unit 50 are amplified by the vibrations of the column support 60, reduction of the drive power of the DC motor 10 is also enabled, so that energy saving of the parts conveyor apparatus 1 is achieved.

(5) According to the parts conveyor apparatus 1 in the first embodiment, the user is able to install the parts conveyor apparatus 1 easily only by fixing the bracket 75 which constitutes the column support fixing unit 70 to a desired position on the base 80. The user is also able to adjust the parts conveyor apparatus 1 to a desired height, orientation and position easily only by loosening the first column support fixing screw 807 or the second column support fixing screw 808 screwed into the second clamp 73 which constitutes the column support fixing unit 70. After having adjusted, the user is able to fix the parts conveyor apparatus 1 easily only by screwing the first column support fixing screw 807 or the second column support fixing screw 808. Therefore, installation of the parts conveyor apparatus 1 in the first embodiment is achieved easily and flexibly, so that installation performance is improved.

(6) According to the parts conveyor apparatus 1 in the first embodiment, the DC motor 10 is fixed with the direction of the axis L of the output shaft 13 oriented substantially vertically to the direction of the plane (the front surface 30*a*) of the spring member 30, and the rotary panel 20 rotates in substantially parallel to the plane (the front surface 30*a*) of the spring member 30. According to the parts conveyor apparatus 1 configured in this manner, fixation of the DC motor 10 to the spring member 30 is compactly achieved, and the vibrations generated by the rotation of the rotary panel 20 are efficiently transmitted to the spring member 30.

(7) According to the parts conveyor apparatus 1 in the first embodiment, the spring member 30 integrally includes the motor fixing area 31, the vibrating portion 32, and the vibration transmitting area 33. By fixing the DC motor 10 to the motor fixing area 31 and driving the DC motor 10, the rotary panel 20 rotates eccentrically and hence the motor fixing area 31 vibrates. The vibrations caused by the eccentric rotation are transmitted to the vibrating portion 32 by the integrated configuration of the spring member 30. The vibrations transmitted to the vibrating portion 32 are further amplified. The amplified vibrations are transmitted to the vibration transmitting area 33 without being attenuated owing to the integrated configuration of the spring member 30. Therefore, the spring member 30 is efficiently vibrated in a compact configuration.

(8) According to the parts conveyor apparatus 1 in the first embodiment, since the vibrating portion 32 vibrates in substantially parallel to the plane of the spring member 30, the vibrations in the motor fixing area 31 are efficiently transmitted. The vibrating portion 32 is able to vibrate efficiently, and is able to transmit the vibrations thereof efficiently to the vibration transmitting area 33.

(9) According to the parts conveyor apparatus 1 in the first embodiment, since the vibrating portion 32 is made up of the leaf spring member 321, it is easily machined and hence the vibrating portion 32 is easily formed.

(10) According to the parts conveyor apparatus 1 in the first embodiment, the leaf spring member 321 which constitutes the vibrating portion 32 of the spring member 30 is formed so as to be interposed between the notches 32A and 32B formed therethrough in the direction of thickness (from the front surface 30a to the rear surface 30b) of the spring member 30, complicated machining in the direction of thickness of the spring member 30 is not necessary, and integration by connection as in the case of being formed as a separate member is not necessary. Therefore, the integrated vibrating portion 32 is easily formed.

(11) Since the parts conveyor apparatus 1 in the first embodiment is provided with the reduction gear unit 12 that reduces the number of revolutions of the DC motor 10, the noise (operating sound) generated by the rotation of the rotary panel 20 is reduced by reducing the number of revolutions of the DC motor 10.

Second Embodiment

Figure 6:
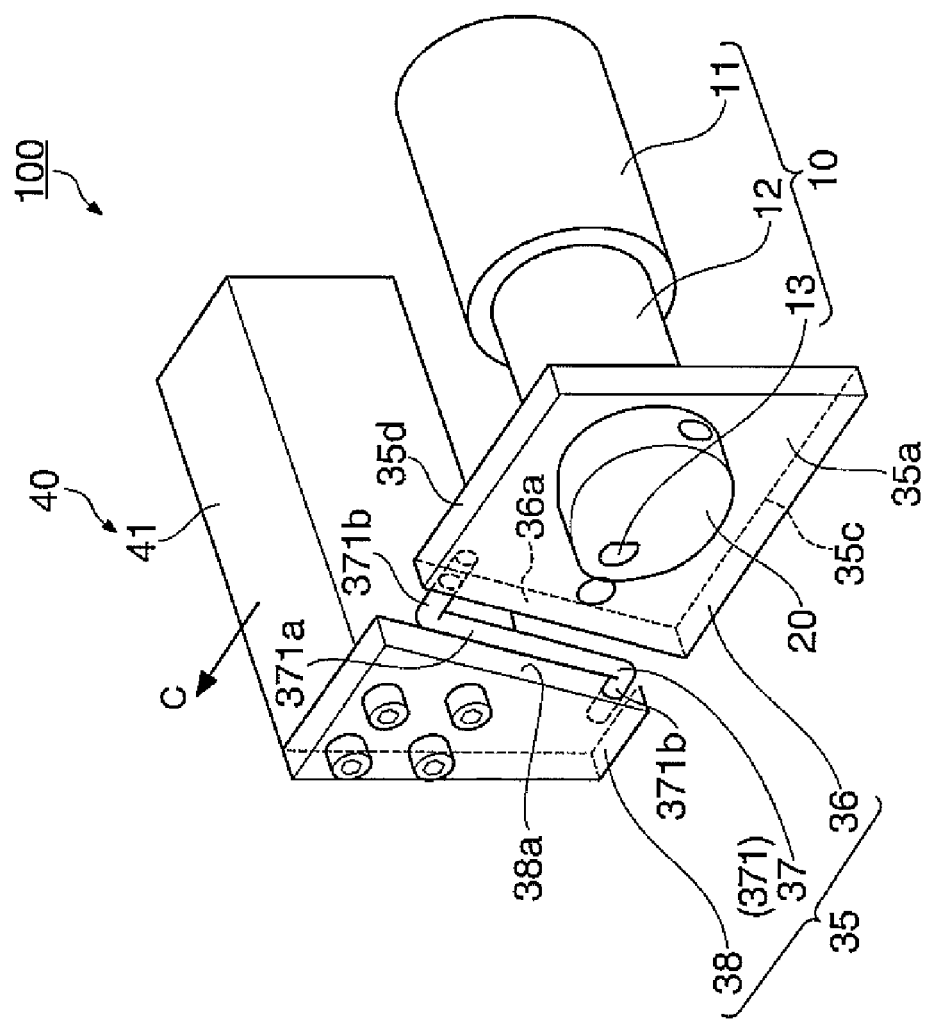
FIG. 6 is a perspective view of a spring member and the periphery of the spring member which constitute the parts conveyor apparatus according to a second embodiment.
Figure 7:
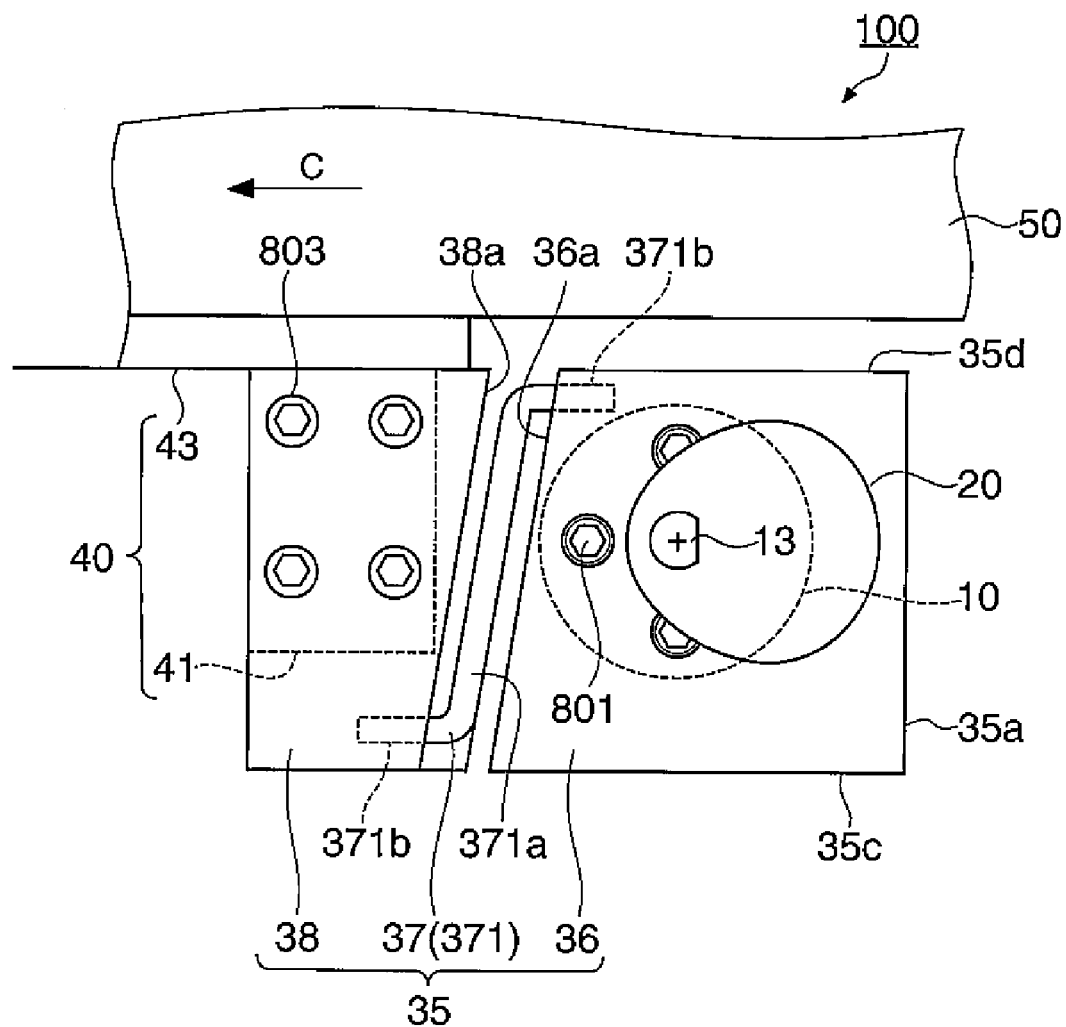
FIG. 7 is a side view of the spring member and the periphery of the spring member.

FIG. 6 is a perspective view of a spring member and the periphery of the spring member which constitutes the parts conveyor apparatus according to a second embodiment. FIG. 7 is a side view of the spring member and the periphery of the spring member. FIG. 6 shows only a principal portion of a parts conveyor apparatus 100 according to the second embodiment and, more specifically, the DC motor 10, a spring member 35 and the first auxiliary plate 41. Referring now to FIGS. 6 and 7, the configuration and the operation of the parts conveyor apparatus 100 will be described.

The parts conveyor apparatus 100 in the second embodiment is different only in configuration of the spring member 35 in comparison with the parts conveyor apparatus 1 in the first embodiment, and other configurations are the same as those in the parts conveyor apparatus 1. In FIGS. 6 and 7, the same components as in the first embodiment are designated by the same reference numerals. Therefore, the spring member 35 which is different from the first embodiment will be described below.

The spring member 35 in the second embodiment is formed into substantially the same rectangular plate shape as the spring member 30 in the first embodiment. The spring member 35 includes a motor fixing area 36, a vibrating portion 37, and a vibration transmitting area 38 which are substantially the same as the first embodiment. The motor fixing area 36, the vibrating portion 37, and the vibration transmitting area 38 in the second embodiment correspond to the motor fixing area 31, the vibrating portion 32, and the vibration transmitting area 33 in the first embodiment, and the substantial shapes and operations are the same as in the first embodiment.

The spring member 35 in the second embodiment is different from the spring member 30 in the first embodiment in that the vibrating portion 37 of the spring member 35 is made up of a wire spring member 371. The wire spring member 371 is formed by machining a metallic wire member having a spring property. In the second embodiment, the leaf spring member 321 in the first embodiment is replaced by the wire spring member 371.

Therefore, the spring member 35 in the second embodiment does not have the notches 32A and 32B for forming the vibrating portion 32 of the spring member 30 as in the first embodiment. Then, the spring member 35 in the second embodiment includes the motor fixing area 36 and the vibration transmitting area 38 as separate members, and the motor fixing area 36 and the vibration transmitting area 38 are integrated by the vibrating portion 37 (the wire spring member 371).

More specifically, the wire spring member 371 includes a spring portion 371a which vibrates as a spring and spring fixing portions 371b which are bent in the opposite direction in substantially parallel to each other at a predetermined angle at both ends of the spring portion 371a. The distal end portions of the spring fixing portions 371b are inserted and fixed to predetermined portions of opposed side surfaces 36a and 38a of the motor fixing area 36 and the vibration transmitting area 38, so that the motor fixing area 36, the vibrating portion 37 and the vibration transmitting area 38 are integrated.

The vibrating portion 37 in the second embodiment (the wire spring member 371) is formed in such a manner that the side on a lower side surface 35c of the spring member 35 is inclined in the direction of conveyance C with respect to the side on an upper side surface 35d as same as in the first embodiment. The vibrating portion 37 formed in this manner vibrates substantially in parallel to a plane (a front surface 35a) of the spring member 35.

According to the second embodiment, the same advantages as in the first embodiment are achieved other than the advantage relating to the machining of the vibrating portion 37. Since the vibrating portion 37 is made up of the wire spring member 371, it is easily machined and hence the vibrating portion 37 is simply formed.

The invention is not limited to the embodiments shown above, and various modifications and improvements may be made. Modifications are described below.

Modification 1

In the parts conveyor apparatus 1 according to the first embodiment, the shape of the "spring" of the vibrating portion 32 (the leaf spring member 321) which is formed in the spring member 30 is not limited to the shape in the embodiments shown above. In this case, the vibrating portion 32 may be formed in a desired shape as needed as a "spring" which vibrates substantially in parallel to the plane (the front surface 30a) of the spring member 30 by designing the vibrating portion 32 with additional element such as a resonance frequency with the motor fixing area 31, the vibration transmitting area 33 which are formed on the spring member 30 and other components (the DC motor 10, the rotary panel 20, the column support 60, and so on).

Modification 2

The parts conveyor apparatuses 1 and 100 in the embodiments described above are applied as the linear parts conveyor apparatuses 1 and 100. However, the invention is not limited thereto, and may be applied as a vibration source of the parts feeder apparatus (such as the parts feeder apparatus 9 shown in FIG. 5) having a bowl formed with a helical rail formed on the inner periphery thereof. In this case, the parts conveyor apparatus may be installed at a selected adequate position in which the vibrations for achieving conveyance are efficiently generated using a plurality of the DC motor 10, the rotary panel 20, and the spring members 30 or 35.

Modification 3

The parts conveyor apparatuses 1 and 100 in the embodiments shown above employ the DC motor 10 having the reduction gear unit 12 as the electromagnetic motor. However, the invention is not limited thereto, and the DC motor which does not have the reduction gear unit 12 may be employed.

Modification 4

The parts conveyor apparatuses 1 and 100 in the embodiments described above employ the DC (direct-current) motor 10 as the electromagnetic motor. However, the invention is not limited thereto, and an AC (alternating current) motor may be employed.

Modification 5

In the parts conveyor apparatuses 1 and 100, the direction of rotation of the DC motor 10 (the direction of rotation of the rotary panel 20) is counterclockwise direction (indicated by an arrow A in FIG. 3) with respect to the front surfaces 30a and 35a of the spring members 30 and 35. However, the invention is not limited thereto, and the rotation may be made clockwise.

Modification 6

In the parts conveyor apparatus 1 according to the first embodiment, the spring member 30 (the motor fixing area 31, the vibrating portion 32 and the vibration transmitting area 33) is formed of the substantially rectangular shaped metallic material, and the vibrating portion 32 (the leaf spring member 321) is integrally formed by machining (cutting, for example) the metallic material. However, the invention is not limited thereto, and the leaf spring member 321 of the vibrating portion 32 may be integrally formed as the spring member by forming the leaf spring member using a separate metallic member and fixing the same to the motor fixing area, and the vibration transmitting area as in the second embodiment.

Modification 7

In the parts conveyor apparatus 100 according to the second embodiment, the vibrating portion 37 of the spring member 35 is made up of the wire spring member 371. However, the invention is not limited thereto, and the vibrating portion 37 may be designed by selecting a spring material or a shape as needed as a "spring" which vibrates substantially in parallel to the plane (the front surface 35a) of the spring member 35 with an additional element such as a resonance frequency with respect to the motor fixing area 36, the vibration transmitting area 38 of the spring member 35, and other components (the DC motor 10, the rotary panel 20, the column support 60 and so on).

Although best modes for carrying out the invention are disclosed in the description shown above, the invention is not limited thereto. In other words, although the invention is shown in the drawings and described relating especially to specific embodiments, various modifications (alterations and improvements) relating to the specific shape, material and number of the components may be made to the embodiments shown above by those skilled in the art without departing from the scope of the technical sprit and object of the invention. Therefore, implementation of the invention by modifying the specific shape, material and number of the components by those skilled in the art is also included in the invention.

What is claimed is:

1. A parts conveyor apparatus includes
a conveyor unit that conveys the parts using vibrations;
an electromagnetic motor that generates the vibrations;
a rotary panel which is mounted on an output shaft of the electromagnetic motor and rotates eccentrically by rotation of the output shaft thereby generating vibrations; and
a planar spring member which vibrates by the rotation of the rotary panel, wherein
the spring member includes a motor fixing area to which the electromagnetic motor is fixed, a vibrating portion which vibrates by the rotation of the rotary panel, and a vibration transmitting area which transmits the vibrations of the vibrating portion to the conveyor unit, and the motor fixing area, the vibrating portion and the vibration transmitting area are integrated to each other, and
the vibrating portion vibrates in substantially parallel to the plane of the spring member.

2. The parts conveyor apparatus according to claim 1, further comprising:
a vibration transmission auxiliary unit that connects the spring member and the conveyor unit, and transmits the vibrations of the spring member to the conveyor unit.

3. The parts conveyor apparatus according to claim 2, further comprising:
a column support that supports the parts conveyor apparatus; and
a column support fixing unit that fixes the column support to the conveyor unit and a base.

4. The parts conveyor apparatus according to claim 1, wherein the electromagnetic motor is fixed with the direction of the axis of the output shaft thereof oriented in substantially vertically to a direction of a plane of the spring member, and the rotary panel rotates in substantially parallel to the plane of the spring member.

5. The parts converr apparatus according to claim 1, wherein the vibrating portion is made up of a leaf spring member.

6. The parts conveyor apparatus according to claim 5, wherein the leaf spring member is formed so as to be interposed between notches formed therethrough in the direction of thickness of the spring member.

7. The parts conveyor apparatus according to claim 1, wherein the vibrating portion is made up of a wire spring member.

8. The parts conveyor apparatus according to claim 1, further comprising a reduction gear unit that reduces the number of revolutions of the electromagnetic motor.

* * * * *